(12) United States Patent
Watanabe et al.

(10) Patent No.: US 11,717,754 B2
(45) Date of Patent: Aug. 8, 2023

(54) GAME SUPPORT SYSTEM, PROGRAM, INFORMATION COMMUNICATION TERMINAL, AND CONNECTION DEVICE

(71) Applicant: BANDAI CO., LTD., Tokyo (JP)

(72) Inventors: Ryuya Watanabe, Tokyo (JP); Yusaku Kubota, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

(21) Appl. No.: 17/382,205

(22) Filed: Jul. 21, 2021

(65) Prior Publication Data

US 2022/0062765 A1 Mar. 3, 2022

(30) Foreign Application Priority Data

Aug. 27, 2020 (JP) .................................. 2020-143855

(51) Int. Cl.
*A63F 13/537* (2014.01)

(52) U.S. Cl.
CPC .................................. *A63F 13/537* (2014.09)

(58) Field of Classification Search
CPC ...... A63F 13/537; A63F 13/69; A63F 13/822; A63F 13/58
See application file for complete search history.

(56) References Cited

U.S. PATENT DOCUMENTS

2002/0187837 A1* 12/2002 Hasebe ............... A63F 13/5375
463/43
2005/0059483 A1* 3/2005 Borge .................... A63F 13/65
463/29

(Continued)

FOREIGN PATENT DOCUMENTS

| CN | 107667393 A | 2/2018 |
| JP | 2006-51250 A | 2/2006 |

(Continued)

OTHER PUBLICATIONS

JP 2020-143855 Notice of Reasons for Refusal dated Sep. 6, 2021 includes English translation.

(Continued)

*Primary Examiner* — Steve Rowland
(74) *Attorney, Agent, or Firm* — Alston & Bird LLP

(57) ABSTRACT

A game assisting system assists execution of a competitive game progressing through presentation of physical game items executed between players. The game assisting system includes: an information communication terminal associated with a player, the information communication terminal including: an acquisition unit configured to acquire information on a physical game item presented by the player; a display control unit configured to control displaying of information on a display unit; and an information communication unit; and a connection device including a connection unit configured to establish communicable connection between a plurality of the information communication terminals associated with players participating in the competitive game. The display control unit causes the display unit to display the information on the physical game item acquired (Continued)

by the acquisition unit of the information communication terminal of a communication counterpart, when the communicable connection is established by the connection unit.

12 Claims, 8 Drawing Sheets

(56) References Cited

U.S. PATENT DOCUMENTS

| | | | | |
|---|---|---|---|---|
| 2007/0211047 | A1* | 9/2007 | Doan | G06F 3/0393 345/419 |
| 2009/0253513 | A1* | 10/2009 | Ducheneaut | A63F 13/12 463/42 |
| 2010/0164953 | A1* | 7/2010 | Wouhaybi | A63F 13/20 715/852 |
| 2010/0261519 | A1* | 10/2010 | Zapata | A63F 1/04 463/31 |
| 2010/0289217 | A1* | 11/2010 | Lavie | A63F 3/02 273/242 |
| 2011/0079959 | A1* | 4/2011 | Hartley | G07F 17/3223 463/22 |
| 2011/0098092 | A1* | 4/2011 | Reiche, III | A63F 13/235 463/30 |
| 2012/0015701 | A1* | 1/2012 | Zapata | A63F 1/04 463/11 |
| 2013/0231191 | A1* | 9/2013 | Rodriguez Machado | A63F 13/69 463/42 |
| 2014/0179418 | A1* | 6/2014 | Vignocchi | A63F 13/69 463/29 |
| 2018/0304146 | A1* | 10/2018 | Dayal | G06Q 50/34 |

FOREIGN PATENT DOCUMENTS

| | | |
|---|---|---|
| JP | 2008-72355 A | 4/2008 |
| JP | 2008-73256 A | 4/2008 |
| JP | 2013-17809 A | 1/2013 |
| JP | 2017-124182 A | 7/2017 |
| JP | 2019-42417 A | 3/2019 |
| TW | M396707 U1 | 1/2011 |
| WO | WO 2014/199424 A1 | 12/2014 |
| WO | WO 2015/159561 A1 | 10/2015 |

OTHER PUBLICATIONS

TW 11120161960 Notice of Reasons for Refusal dated Feb. 19, 2022 includes English translation.

* cited by examiner (a)

(b)

(a)

(b)

(c)

GAME SUPPORT SYSTEM, PROGRAM, INFORMATION COMMUNICATION TERMINAL, AND CONNECTION DEVICE

CROSS REFERENCES TO RELATED APPLICATIONS

This application claims priority to Japanese Patent Application No. 2020-143855 filed in the Japan Patent Office on Aug. 27, 2020, the entire contents of which are incorporated herein by reference

BACKGROUND

The present invention relates to a game assisting system, a program, an information communication terminal, and a connection device, and in particular relates to a technique of assisting game play using physical items between players at remote locations.

There are games, such as what is known as a trading card game (TCG) and a board game, of a type progressing through presentation of physical game items. In such games, for example, two players sit face to face, and deploy their cards, game pieces, and the like on a game board, in a form of a sheet, a board surface, or the like, and take turns declaring their actions. In this manner, the game progress is managed based on the agreement between the players.

JP-A-2008-073256 discloses a game device that presents a screen configured with a special effect corresponding to a placed card superimposed in a captured image of a board surface, to enhance the excitement of experience of such games.

SUMMARY

The games of the above-described type that progress through presentation of physical items, including the game device disclosed in JP-A-2008-073256, require at least the players of the game to be at the same location to be each capable of recognizing the deployment status of the physical game items of the opponent. Thus, such games have limitations based on requirements such as "the participating players can be at the same location", and "a space for deploying the physical game items is large enough for the players participating".

These limitations may be mitigated at occasions, such as a competition and an event where players gather for a common purpose, and the players may have chance to play the game. Unfortunately, it is rare for such occasions to be constantly given, meaning that it is difficult for a player to play the game unless players he or she knows are nearby.

An object of the present invention is to provide a game assisting system, a program, an information communication terminal, and a connection device improving usability for players.

A game assisting system according to the present invention assists execution of a competitive game progressing through presentation of physical game items executed between players. The game assisting system includes: an information communication terminal associated with a player, the information communication terminal including: an acquisition unit configured to acquire information on a physical game item presented by the player; a display control unit configured to control displaying of information on a display unit; and an information communication unit; and a connection device including a connection unit configured to establish communicable connection between a plurality of the information communication terminals associated with players participating in the competitive game. The display control unit causes the display unit to display the information on the physical game item acquired by the acquisition unit of the information communication terminal of a communication counterpart, when the communicable connection is established by the connection unit.

With the present invention, usability for players can be improved.

DETAILED DESCRIPTION

First Embodiment

Figure 1:
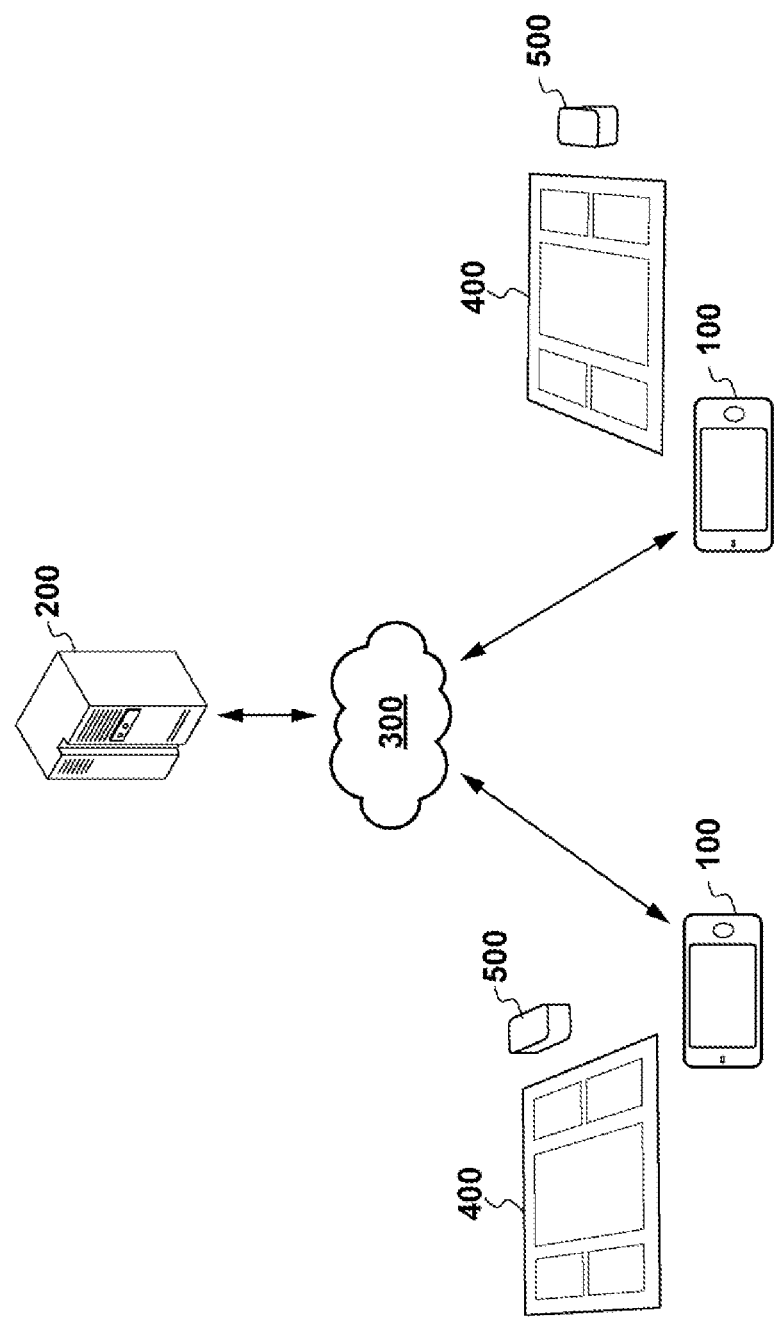
FIG. 1 is a diagram illustrating a configuration of a game system according to an embodiment and a modification of the present invention.

Embodiments will be described below with reference to the attached drawings. The embodiments described below do not limit the invention of the scope of the claims, and not all the features described in the embodiments are essential for the invention. Two or more of a plurality of features described in the embodiments may be combined in any way. The same or similar components are denoted with the same reference numeral, will not be redundantly described.

An embodiment below is described as an example where the present invention is applied to a game system comprising: a smartphone, which is an example of an information communication terminal, configured to be capable acquiring information on a physical game item; and a game server, which is an example of a connection device, configured to be capable of establishing communicable connection between a plurality of the smartphones and enable a competitive game, progressing through presentation of physical game items, to be played between players. Still, the present invention is applicable to any devices capable of enabling players at remote locations to play a competitive game progressing through presentation of physical game items.

The term "physical game item" as used herein refers to an item that is exists with a physical mass in the real world and is used for making the game playable, and is distinguished from virtual items in a form of data or information, instead of being a physical entity, formed in or on the memory or the screen as a concept operable as electronical information when an electronic game is executed for example. Furthermore, "execution of competitive game" progressing through presentation of the physical game item is described as an act of actually playing or progressing a competitive game (for example, in a case of the trading card game, a series of game processes that starts in response to the consent made between the players to start the game or determination of the action order after the preparation is completed), and is assumed not to include a state such as a standby state for various settings, preparation, or matching.

<Configuration of Game System>

FIG. 1 is a diagram illustrating a system configuration of a game system according to the present embodiment. As illustrated in the figure, in the game system, a plurality of smartphones 100 and a game server 200 are configured to be communicably connectable over a network 300. Here, the game server 200 is in charge of providing a service for assisting execution of a competitive game between players at remote locations according to the present game system, and implements communicable connection between the smartphones 100 used by the players participating in the competitive game. A configuration is employed in which each player using the service can play the competitive game by executing a dedicated application program (hereinafter, referred to as assisting application) on the smartphone 100 the player is using, and accessing the game server 200.

The competitive game playable with the game system of the present embodiment is a game of a type that progresses with each player deploying physical game items in his or her play environment and presenting the deployment status to another player participating in the game. Thus, each player participating in the competitive game can present information on the physical game items deployed in his or her play environment to another participating player, and can recognize information on physical game items deployed by the other player on his or her play environment, by viewing what is presented on a screen of the smartphone 100.

When a new presentation is made due to an action made by any of the players, the action is resolved based on a game rule determined in advance between the players. Then, the player who has deployed the physical game item corresponding to the resolution result operates or deploys a physical game item as appropriate. In this manner, the game progresses. The presentation due to an action may include presentation involving no change in a deployment status of physical game items, such as declaration of a player due to a physical game item that has already been deployed.

In the present embodiment, a description is given assuming that the competitive game is a trading card game (TCG) played between two players each using a field sheet 400 serving as a game board according to the present invention and a set of game cards 500 (a predetermined number of game cards 500) to be placed on the field sheet 400. However, embodiments of the present invention are not limited to this. Specifically, the competitive game playable with the game system may be any game that can progress through the players presenting their physical game items to each other, and the number of players is not limited to two. Thus, the physical game items to be deployed in the play environment by each player in the competitive game are not limited to the field sheet 400 and the game cards 500. For example, the game board such as the field sheet 400 can be omitted, and the game cards 500 that are placed objects may further include or may be replaced by figures or other objects. Preferably, in the game progressing through presentation of the deployment status, the physical item used as a placed object is configured to have an outer appearance indicating in a recognizable manner, the effect and the like in the competitive game, as in the case of the game cards 500.

Considering the characteristics of the game, the TCG can be played without using devices such as the smartphone 100 if the two players are situated face to face. For example, with information on an operation for the player to perform for the game progress is clearly written on each physical game item, such as information on placement positions of various game cards 500 described on the field sheet 400 and information on a required condition and a resolution method for an action that can be exerted described on each of the game cards 500, the players can make the game progress while checking the physical game items presented on the field. Thus, the TCG is characterized in that the game can be played between two players if there is a play environment (space) where players, who have brought physical game items of the same game title (game content), can each recognize the content of the physical game item presented by the opponent.

In the present game system, an environment is provided where the players at remote locations can present the physical game item deployment statuses to each other, whereby the competitive game can progress using information given to the physical game items, no matter what the game title of the TCG is. Thus, considering such characteristics of the TCG, the assisting application of the game system of the present embodiment is assumed to be configured to enable selection from a plurality of types of game titles of a competitive game (TCG) implementing an online competition. More specifically, each player selects, on the assisting application, a game title he or she wants to compete. Then, matching is made with another player who similarly wants to compete in the same game title. Then, the players can execute the competitive game using the field sheet 400 and the set of the game cards 500 for the game title, and the smartphone 100 executing the assisting application.

In the present embodiment, a description is given assuming that a plurality of types of game titles of the competitive game (TCG), the game play of which can be supported by the service related to the game system, are provided. However, embodiments of the present invention are not limited to this. The assisting application and the game system may be dedicatedly provided for a single game title.

With the game system of the present embodiment, when the player selects the game title he or she plays and performs an operation input related to the start of the matching on the smartphone 100, a matching start request is transmitted to the game server 200. For example, upon receiving the matching start request, the game server 200 configures a room in the game server 200 or selects a room that has already been configured, and gives an access right to the room, and also to the smartphone 100 of the opponent that has similarly transmitted the matching start request for the same game title. Then, the assisting application of the relevant smartphone 100 executes processing of accessing the room for which the access right has been given.

As a result, the two smartphones 100 that have transmitted the matching start request for the same game title can exchange information via the single room, whereby the communicable connection between the smartphones 100 is implemented. Thus, a state is achieved in which the two players using the smartphones 100 in the state of accessing the single room can execute the competitive game of the game title selected.

In the game system of the present embodiment, communicable connection between the two smartphone 100 is achieved via the network 300 and game server 200 for assisting the execution of the competitive game between the players at remote locations, and thus the description is given assuming that the communication scheme between the smartphones 100 does not include near field communications. Still, embodiments of the present invention are not limited to this, and the communication connection scheme between the smartphones 100 may include near field communications. For example, the communication connection between the smartphones 100 as in the game system may be implemented, with one of the smartphones 100 operating as a host to serve as the game server 200.

<Functional Configuration of Smartphone 100>

Figure 2:
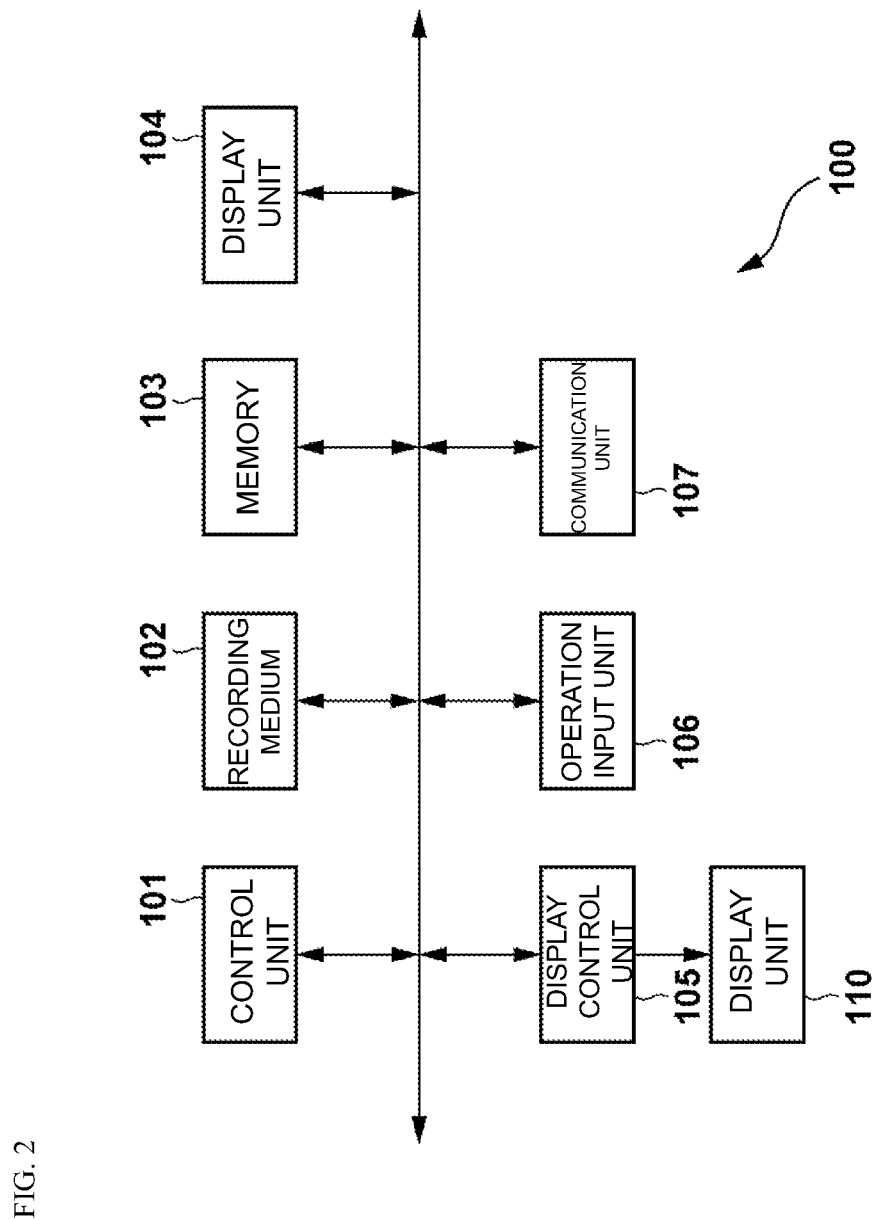
FIG. 2 is a block diagram illustrating a functional configuration of a smartphone 100 according to an embodiment and a modification of the present invention.

Next, a functional configuration of the smartphone 100 according to the present embodiment will be described with reference to a block diagram of FIG. 2.

The control unit 101 is, for example, a CPU and controls operations of blocks of the smartphone 100. Specifically, for example, the control unit 101 reads an operation program of the blocks recorded in a recording medium 102 and a program related to the assisting application, loads the programs onto a memory 103, and executes the programs to control the operations of the blocks.

The recording medium 102 is, for example, a recording device, such as a nonvolatile memory or an HDD, capable of perpetually holding data. The recording medium 102 stores, in addition to the operation program for the blocks of the smartphone 100, information on a parameter required for the operations of the blocks, various types of used by the assisting application, and the like. The memory 103 is, for example, a storage device such as a volatile memory used for temporarily storing data. The memory 103 is not only used as a region onto which the operation program of the blocks is loaded, and is also used as a storage region for temporarily storing data output by the operations of the blocks and the like.

In the present invention, the image capturing unit 104 is an image capturing device unit, for example, including an image sensor such as a CCD or CMOS sensor, and is used for acquiring information on physical game items deployed by a single player, which are, the field sheet 400 and a set of game cards 500. As will be described in detail later, the image capturing unit 104 operates to intermittently capture images at predetermined timings while the assisting application is being executed, and to sequentially output the captured images thus acquired. Specifically, in the game system of the present invention, the information on the physical game item acquired during the competitive game is configured to have contents corresponding to the state of deployment in the play environment of each player, and is sequentially acquired to reflect a change along the progress of the game based on whether the game card 500 is facing up or facing down, that is, whether a physical game item is facing up or down can be recognized, whether the physical game item is facing up or down cannot be recognized but the physical game item can be recognized to exist.

The display control unit 105 is in charge of controlling presentation of various types of information to the user, on the smartphone 100. A description will be given assuming that the smartphone 100 of the present invention includes the display unit 110 serving as a unit for presenting various types of information to the user, displaying a screen (such as a game screen, or another screen such as an OS menu screen). However, the information presentation unit is not limited to these, and it is a manner of course that replacement or addition can be made. The display unit 110 is a display device of the smartphone 100 such as an LCD, and the content displayed thereon is controlled by the display control unit 105. While a description will be given assuming that the display unit 110 is a display device incorporated in the smartphone 100, it is a matter of course that the display unit 110 may be a display device detachably and externally attached to the smartphone 100.

For example, the operation input unit 106 is a user interface of the smartphone 100 such as a touch panel or a button for example. When the operation input made by the user is detected, the operation input unit 106 outputs a control signal corresponding to the operation input, to the control unit 101.

The communication unit 107 is a communication interface of the smartphone 100 for communicating with another device. The communication unit 107 is connected to an external device via the network 300 using a predetermined communication scheme which may be a wired or wireless scheme, and transmits data to and from the external device. The program of the assisting application may be configured to be receivable from an external device through the communication unit 107.

<Functional Configuration of Game Server 200>

Figure 3:
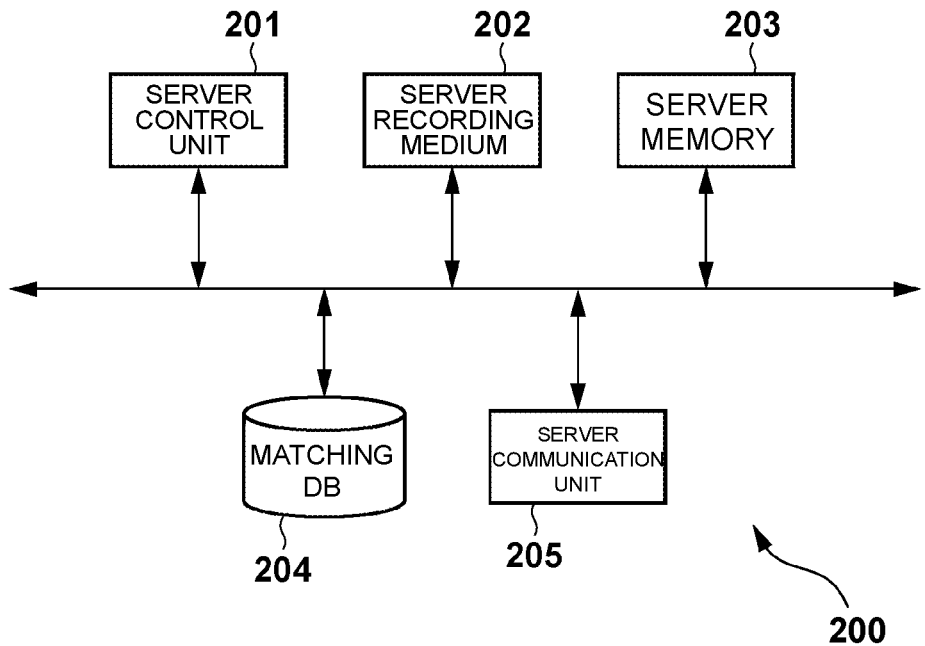
FIG. 3 is a block diagram illustrating a functional configuration of a game server 200 according to an embodiment and a modification of the present invention.

Next, a functional configuration of the game server 200 of the present embodiment will be described with reference to a block diagram of FIG. 3. The functional configuration of the game server 200 is described with a configuration for implementing the functions that are similar to the configuration of the smartphone 100 written with a prefix "server" provided, to be distinguished from the configuration of the smartphone 100.

The server control unit 201 is a CPU for example, and controls operations of each block of the game server 200. Specifically, for example, the server control unit 201 reads an operation program of the blocks recorded in a server recording medium 202, loads the operation program onto a server memory 203, and executes the program to control the operations of the blocks.

The server recording medium 202 is, for example, a recording device, such as a nonvolatile memory or an HDD, capable of perpetually holding data. The server recording medium 202 stores, in addition to the operation program for the blocks of the game server 200, information on a parameter required for the operations of the blocks and the like. The server memory 203 is, for example, a storage device such as a volatile memory used for temporarily storing data. The server memory 203 is not only used as a region onto which the operation program of the blocks is loaded, and is also used as a storage region for temporarily storing data output by the operations of the blocks and the like.

Figure 9:
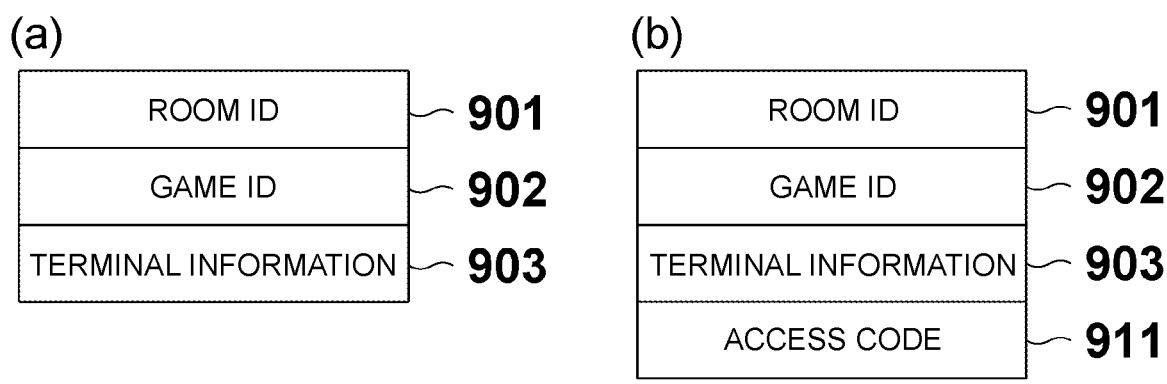
FIG. 9 is a diagram illustrating a data configuration example of various types of information used in a game system according to an embodiment and a modification of the present invention.

A matching DB 204 is a database managing information (room information) about a room configured in response to a matching start request. For example, as illustrated in FIG. 9(a), the room information may be configured to include a game ID 902 indicating a game title (type) executed using the room, and terminal information 903 indicating a terminal ID uniquely identifying the smartphone 100 provided with the access right to the room, in association with a room ID 901 uniquely identifying the room. A description is given assuming that in the game system of the present embodiment, the smartphone 100 having executed the assisting application and accessing the game server 200 is provided with a terminal ID uniquely identifying the smartphone 100, and that the terminal ID provided to a single smartphone 100 is maintained at least as long as the access is continuously performed.

The server communication unit 205 is a communication interface of the game server 200 for communicating with other devices. The server communication unit 205 connects to an external device via the network 300 with a predetermined communication scheme that may be wired or wireless scheme, and transmits and receives data.

<Service Overview>

An overview of a service assisting execution of an online competitive game (TCG), provided using a game system of the present embodiment will be described below. The competitive game executed using the service may be any game using generally available physical game items such as the field sheet 400 and the game cards 500 and progressing with participating players confirming with each other how the physical game items are deployed, and thus is not limited to a particular type. Although not elaborated herein due to irrelevance to the features of the present invention, it is assumed that the voice of each player is picked up by the smartphone 100 related to the player while the service is being provided, to be presented to the opponent player.

A description will be given assuming that the provision of the service according to the present game system starts in response to an operation, related to matching start, performed on the assisting application executed on the smartphone 100. More specifically, a description is given assuming that the provision of service starts when the matching start request transmitted in response to the operation is received by the game server 200, information (connection destination information) for accessing a corresponding room is issued and returned to the smartphone 100 in response, and the room is accessed via the assisting application. In the present embodiment, a description is given assuming that provision of the service starts in response to the access to the room for the sake of simplicity of the description, but it is a matter of course that provision of the service may start when the smartphones 100 of all the players participating in the competitive game access the room for example.

Management of the progress of the competitive game implementing an online competition using the game system of the present embodiment includes at least two following stages in the assisting application executed by each smartphone 100. The first stage is a preparation stage according to the present invention. In this first stage, each player deploys the field sheet 400 and the game cards 500 in his or her play environment (an environment in which the player deploys the field sheet 400 and the game cards 500 by operating the smartphone 100) in an arrangement according to the game title selected. The second stage following the preparation stage is a play stage according to the present invention. In the second stage, the competitive game of the game title selected is actually played, using the field sheet 400 and the game cards 500 deployed in the preparation stage.

For the sake of simplicity of the description in the present embodiment, and for reducing the processing load on the smartphone 100, a description is given assuming that the progress of the competitive game is managed with only two types of stages that are the preparation stage and the play stage described above. In other words, a description is given assuming that the progress of the competitive game is managed in accordance with whether the stage is the preparation stage involving no game progress or the play stage involving the game progress (referenced during control). Still, embodiments of the present invention are not limited to this, and the management may include stages other than the preparation stage and the play stage.

In the present game system, the information on the deployment status is presented to each player by the assisting application so that the deployment status of the physical game items of opponent players is notified in the play stage (while the competitive game is being executed). In the present embodiment, the information on the deployment status of the physical game items is acquired as a captured image, and is presented using the display unit 110 of each smartphone 100. More specifically, in the play stage, the display control unit 105 of the smartphone 100 of each participating player is controlled to display, on the display unit 110, a captured image captured by the image capturing unit 104 of the smartphone 100 of the opponent player. Thus, the display units 110 display different contents (captured images indicating the deployment status of the opponent). Thus, by referring to the captured image (an image indicating the deployment status of the physical game items of the opponent player) displayed on the display unit 110 while the competitive game is being executed, each player can check the content of the operation performed by the opponent player, check whether an operation he or she has performed is reflected, come up with a strategy, and perform other like operations.

Considering the above, in the interest of fairness of the competitive game, the smartphone 100 of each participating player needs to be set in a state of favorably capturing the deployment status of the physical game items of the player. Specifically, in the preparation stage, adjustment needs to be performed for capturing a captured image favorably showing the deployment status of the physical game items in the play environment of each player, so that the game proceeds favorably thereafter. In other words, the positional relationship between the smartphone 100 and the field sheet 400 and the set of the game cards 500 needs to be adjusted in the play environment of each player to enable favorable image capturing.

Figure 4:
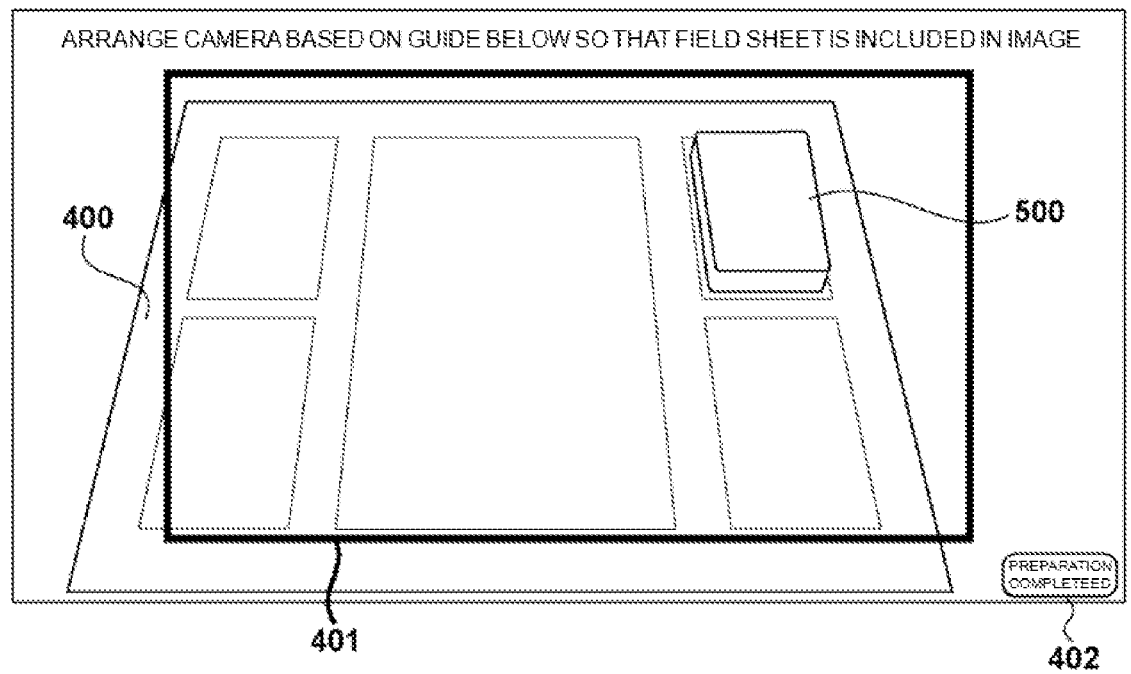
FIG. 4 is a diagram illustrating display in a preparation stage in an assisting application according to an embodiment and a modification of the present invention.

The assisting application of the present embodiment includes a mechanism facilitating achievement of a favorable positional relationship between the smartphone 100 and the deployed area of the physical game items in the play environment of each player in the preparation stage preceding the play stage so that a captured image favorably showing the deployment status of the physical game items can be obtained. More specifically, with the assisting application, in the preparation stage, a screen is displayed that is configured to have a guide display superimposed on the captured image captured by the image capturing unit 104 (of the smartphone 100 executing the assisting application) as illustrated in FIG. 4. The guide display indicates a recommended arrangement position of the physical game items.

In the example illustrated in FIG. 4, the guide display is represented by a frame line 401 included in the guide display, to indicate the recommended position and size (the size to be occupied by the image or an occupancy in the image) of the field sheet 400 placed in the play environment, in the captured image. By checking the captured image displayed on the display unit 110 with the guide display superimposed thereon, the player can adjust the position/orientation of the smartphone 100 or the arrangement of the field sheet 400 so that a captured image that can favorably present his or her deployment status of the physical game items can be obtained. The stabilization of the smartphone 100 and adjustment of the arrangement of the field sheet 400 or the like may be performed with a member such as an arm or a table used by each player, and any member may be used for this purpose.

In the present embodiment, a description is given assuming that the information on the placement position of the game cards 500 and the like is written on the field sheet 400, and that the guide display shows the recommended arrangement position and the recommended image capturing size of the field sheet 400. However, embodiments of the present invention are not limited to this. The guide display may show the recommended arrangement position and the recommended image capturing size for at least any of the physical game items used in the competitive game, that is, at least any of the field sheet 400 and the game cards 500 (such as the arranged position of the deck).

In the present embodiment, a description is given assuming that the guide display shows, using a frame line or the like superimposed on the captured image, the size (reference size) to be occupied by an image of the corresponding physical game item in the captured image and the arranged position. However, embodiments of the present invention are not limited to this. The guide display may be, for example, implemented by other display modes, not superimposed on the captured image, indicating how the arrangement should be in the captured image.

The initial arrangement of the physical game item, the size of the field sheet 400 used, and the like differ among game titles. Thus, with the assisting application, the guide display displayed is switched in accordance with the game title selected for playing the competitive game. More specifically, data recorded in the recording medium 102 according to the assisting application includes information on the guide display for each game title supported by the game system. In the preparation stage, the corresponding guide display is used for screen configuration.

By the way, not all the players necessarily have the member, such as an arm, with which the smartphone 100 can be held in a favorable state. Thus, it may be difficult to arrange the physical game items to be included in the guide display, in a captured image obtained by the image capturing unit 104. Thus, with the assisting application of the present embodiment, a guide display indicating a favorable deployment mode of the physical game item is displayed in the preparation stage, but control is not performed to disable the game play even if such a deployment mode fails to be achieved. Thus, the captured image displayed in the preparation stage merely indicates an index for image capturing setting for implementing favorable game play. With this configuration, analysis processing on the captured image or the like need not to be performed for recognizing the deployment status of the physical game items in the assisting application. Thus, the required performance of the smartphone 100 is not excessively limited, and a time required before executing the competitive game can be shortened. Still, embodiments of the present invention are not limited to this, and a configuration may be employed in which analysis processing is executed on a captured image and a result of analyzing whether the deployment status of the physical game items in the captured image conforms to the guide display is notified.

In the present embodiment, the preparation stage related to the progress of the competitive game is completed when an operation input for preparation completion is received by the assisting application executed by the smartphones 100 of both players. Specifically, in the preparation stage, each player performs an operation input on a preparation complete button 402 illustrated in FIG. 4 for example upon confirming the image capturing mode of the captured image presented to the opponent player while the competitive game is being played. As a result, the assisting application of the player can recognize that a state (preparation complete state) where the preparation stage can transition to play stage has been achieved. In this state, a presentation requesting for maintenance of the positional relationship between the smartphone 100 and the physical game item set in the preparation stage until the game play ends may be performed, to make the play experience of the competitive game executed in the play stage favorable. Information indicating that each smartphone 100 has transitioned to the preparation complete state is transmitted to the game server 200 and shared between the smartphones 100 of the participating players via the relevant room.

When the smartphones 100 of all the players of the competitive game transition to the preparation complete state, the assisting application executed by each smartphone 100 transitions to the play stage, and control is performed to display, instead of the captured image captured by the image capturing unit 104 of the own device which has been displayed in the preparation stage, the captured image captured by the image capturing unit 104 of the smartphone 100 of the opponent player. Specifically, in the game system of the present embodiment, an image indicating the deployment status of the physical game items of the opponent player is displayed, when the opponent player is determined, the communicable connection with the smartphone 100 of the opponent player 100 via the room is established, and the preparation stage transitions to the play stage. What is displayed in the play stage does not include the captured image captured by the own device, and only includes the captured image captured by the smartphone 100 of the opponent player. This is because information on the deployed physical game items of each player can be confirmed by the player in the real world (play environment) without using the display unit 110, so that only the information on the deployed physical game items of the opponent player needs to be displayed on the display unit 110 in the play stage, and because the display region for the captured image captured by the smartphone 100 of the opponent player is preferably set to be as large as possible to guarantee high visibility of the information on the deployed physical game items of the opponent player.

Thus, for example, after the preparation stage has been completed, the captured image captured by each smartphone 100 is transmitted to the game server 200 via the communication unit 107, and is transmitted to the smartphone 100 of the opponent player accessing the room. The server memory 203 of the game server 200 may include a buffer for temporarily storing captured images received from the accessing smartphone 100 for each room the room information on which is managed in the matching DB 204, and the buffered captured images may be transmitted to the corresponding smartphone 100 in chronological order. Thus, the server control unit 201 controls image transmission to transmit, when both two smartphones 100 accessing the room transition to the preparation complete state, a captured image captured by one of the smartphones 100 to the other smartphone 100.

In the present embodiment, a description is given assuming that when the smartphones 100 of all the players in the competitive game transition to the preparation complete state, that is, when an operation input for preparation completion is made on the two smartphones 100, the preparation stage transitions to the play stage, and the screen is switched to that showing the physical game item deployment status of the opponent. However, embodiments of the present invention are not limited to this. The transition to the play stage may occur before the preparation of the opponent player is completed, for example. In this case, a configuration may be employed in which the screen is switched to that showing the physical game item deployment status of the opponent player after the switching to the play stage so that a status of the opponent player during preparation can be checked, or to that including an alternative image indicating preparation standby, instead of the captured image, until the smartphone 100 of the opponent player transitions to the preparation complete state.

As described above, in a game such as the TCG, an action turn of each player is determined, and the game progresses with the players taking turns. Generally, the action turn of the players of the TCG is determined by rock paper scissors, dice, coin toss, or the like. However, in the interest of fairness, determining the action turn in this manner is not favorable in a situation where the participating players are not face to face as in the game system of the present embodiment. For example, due to communication delay, fairness of rock paper scissors, requiring simultaneous actions, might not be guaranteed. A situation where one of the players gets to throw the dice or coin cannot be completely free of risk of cheating.

In view of this, in the system of the present embodiment, lottery processing is executed in one of the smartphones 100 of the players participating in the competitive game, a result of the lottery is shared between the smartphones 100 involved in the competitive game. Specifically, the lottery processing related to the assisting application is executed in one of the two smartphones 100 involved in the competitive game and provided with the access right to the room earlier for example, and information on the action turn determined as a result of the lottery is transmitted to the game server 200 and is shared with the other smartphone 100 via the room. In the lottery processing, for example, after a lottery image, showing coin toss or the like, is displayed on the display units 110 of both smartphones 100, information indicating the lottery result (action turn) corresponding to each smartphone 100, such as "your action turn" or "the opponent's action turn", may be displayed for notification.

In the present embodiment, a description is given assuming that the lottery processing is executed in any of the smartphones 100 involved in the competitive game, but embodiments of the present invention are not limited to this. The lottery processing may be executed in the game server 200, when the two smartphones 100 transition to the preparation complete state, for example.

To enable players to easily communicate with each other, the game system of the present embodiment has functions of making their terminals exchange and display predetermined types of images (hereinafter, referred to as stamps) and messages while the competitive game is progressing (or during a period in which the access state of a plurality of smartphones 100 to the room is maintained). There may be a plurality of types of such stamps that can be transmitted. For example, a stamp common in the game system as a whole may be provided to be usable in the assisting application, or a stamp may be provided for each selected game title or for each room.

Figure 5:
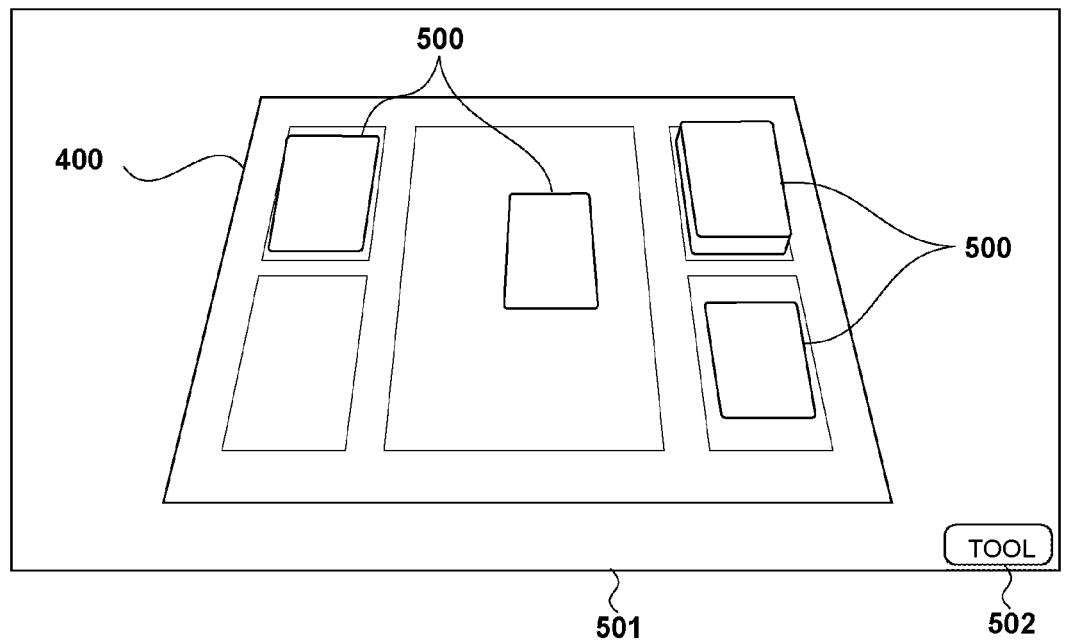
FIG. 5 is a diagram illustrating display in a play stage in the assisting application according to an embodiment and a modification of the present invention.
Figure 5:
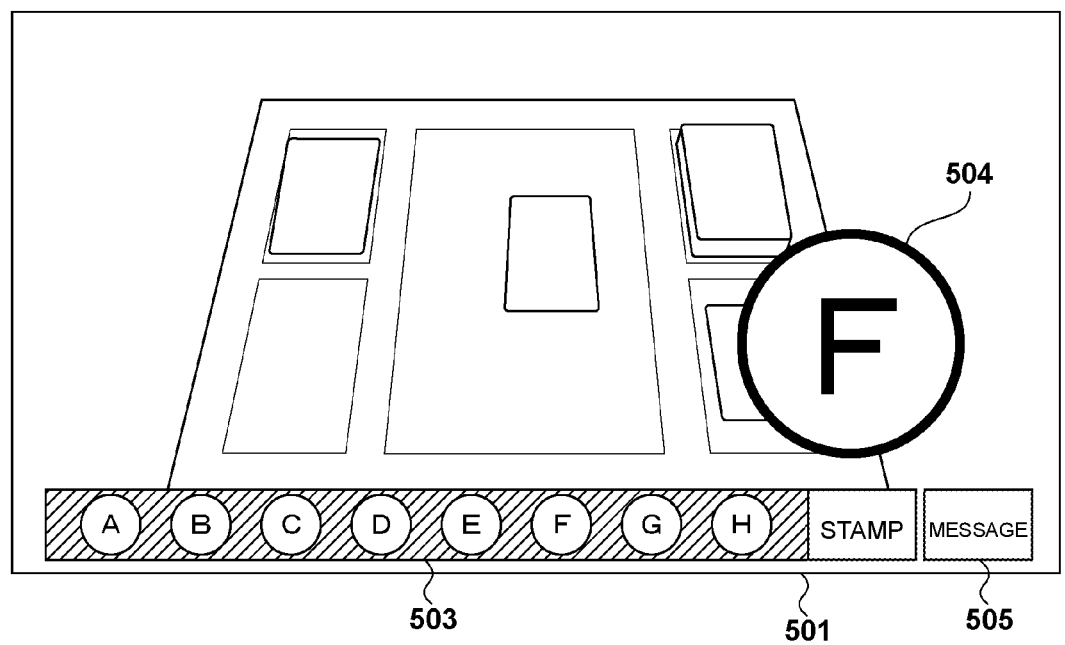

A stamp is transmitted when an operation of selecting a desired stamp in a stamp list 503 as illustrated in FIG. 5(b) is made. The list is displayed when an operation input is made on a communication tool icon 502 on a screen 501 (including the captured image indicating the physical game item deployment status of the opponent player) displayed in the play stage as illustrated in FIG. 5(a) for example. Specifically, when the control unit 101 executing the assisting application transmits, to the game server 200 via the communication unit 107, conversation information including a stamp ID uniquely identifying the selected stamp, together with a message transmission request, the conversation information is transferred to the smartphone 100 of the other player accessing the relevant room, and the stamp is displayed. The stamp selected as the transmission target may be included in and displayed on the screen of the smartphone 100 of the transmission source as indicated by a stamp image 504 in FIG. 5(b).

When the conversation information transmitted from the smartphone 100 of the opponent player is received, the display control unit 105 configures a screen by superimposing a stamp image, corresponding to the conversation information, on the captured image of the opponent player in the assisting application, and makes the display unit 110 display the screen.

Furthermore, the assisting application may have a function to, in response to an operation input made on a message icon 505 among tools displayed as a result of an operation input on the communication tool icon 502 for example, accept an input of text, and as in the case of the stamp, configure conversation information including the text input and transmit the conversion information to the game server 200 together with the message transmission request.

Such a communication function may be configured to be capable of accepting an input of at least one of an image and text to be displayed on the smartphone 100 of the opponent player. The communication function may include something other than image or text.

A description will be given assuming that, as in the preparation stage, to reduce calculation load on the smartphone 100 and the game server 200, in the game system of the present embodiment, the determination on the operation input made by each player and game progress management based on captured image analysis or voice recognition are not performed in the play stage. Thus, the game system of the present embodiment merely performs the allocation of a room related to the matching and display control for the preparation stage and play stage, for supporting the execution, via the network 300, of the competitive game progressing through presentation of physical game items, and the competitive game progresses under consent between the players.

<Competitive Game Processing>

Figure 6:
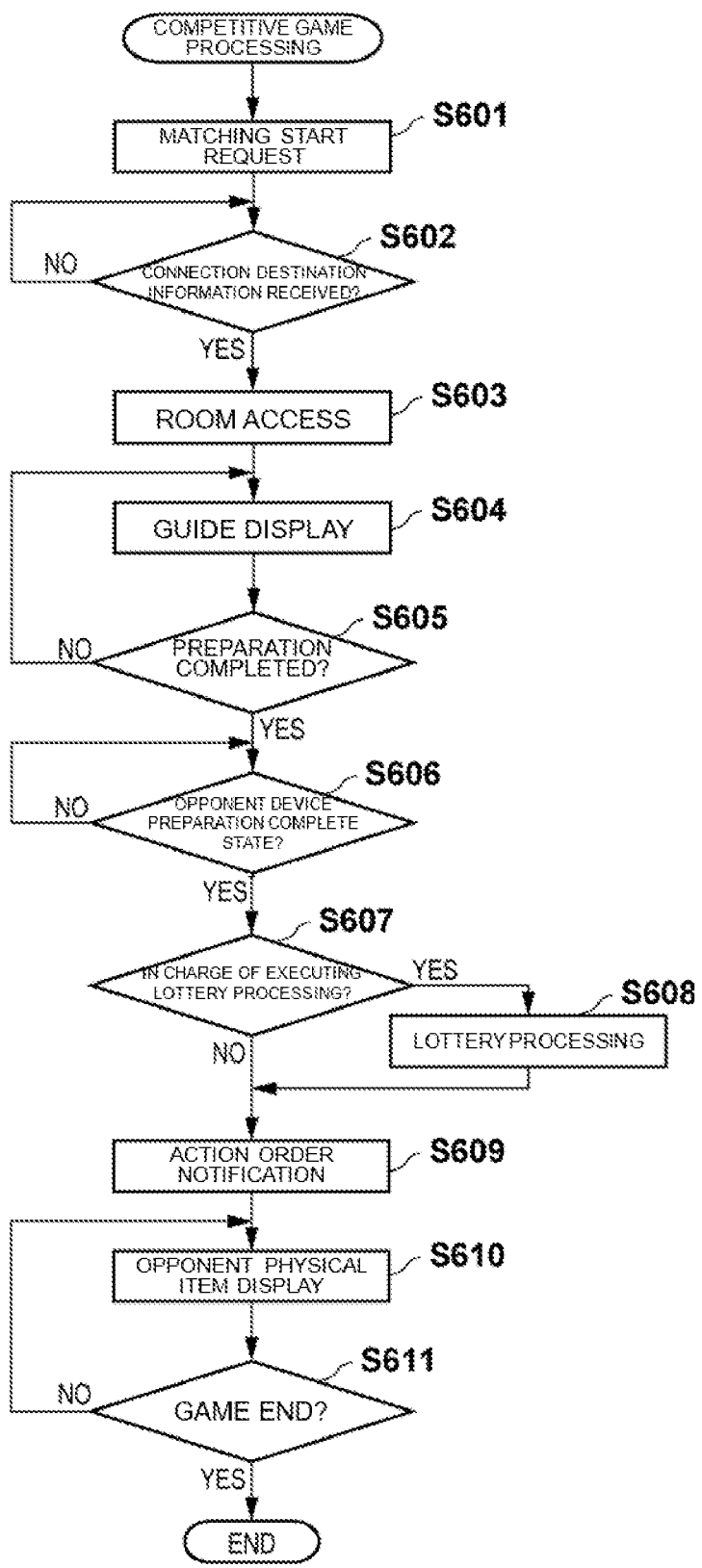
FIG. 6 is a diagram illustrating competitive game processing executed by the smartphone 100 according to an embodiment and a modification of the present invention.

Competitive game processing executed using the assisting application in the smartphone 100 of the present embodiment configured as described above will be described in detail with reference to a flowchart in FIG. 6. The processing corresponding to the flowchart can be implemented when the control unit 101 reads a corresponding processing program stored in the recording medium 102, and loads and executes the program on the memory 103.

A description is given assuming that the present competitive game processing starts, for example, when the assisting application starts in the smartphone 100 and an operation input for matching start for any of the game titles is detected. In the following description, the smartphone 100 executing the present competitive game processing is referred to as an "own device", and an environment in which the smartphone 100 is used is referred to as an "own environment" (which is a play environment where physical game items are deployed and the like). On the other hand, the smartphone 100 communicably connected to the own device as a result of the matching is referred to as an "opponent device", and an environment in which the opponent device is used is referred to as an "opponent environment" (which is a play environment where physical game items are deployed and the like by the opponent player).

In S601, the control unit 101 configures information on matching for a competitive game of the selected game title, transmits the information to the communication unit 107, and makes the communication unit 107 transmit the information to the game server 200 together with the matching start request.

In S602, the control unit 101 determines whether connection destination information corresponding to the matching start request transmitted in S601 has been received. When the control unit 101 determines that the connection destination information has been received, the processing proceeds to S603, and the processing in this step is repeated when the information is determined to have not been received.

In S603, the control unit 101 executes processing of accessing the room to which the access right, configured by the game server 200, has been given, based on the connection destination information received. Upon determining that the state of accessing the relevant room has been achieved, the control unit 101 sets the progress stage of the own device in the competitive game to be the preparation stage, and the processing proceeds to S604.

In S604, the display control unit 105 configures a screen related to adjustment assistance for positional relationship between the physical game items and the smartphone 100 in the own environment under the control by the control unit 101, and makes the display unit 110 display the screen. More specifically, the control unit 101 controls the image capturing unit 104 to start capturing images and to output the captured image at a predetermined time interval. At a timing when the screen to be displayed is configured, the display control unit 105 reads the captured image stored in the memory 103, superimposes the guide display related to the selected game title as well as a required GUI on the captured image, and makes the display unit 110 display the screen thus configured. The captured image captured by the image capturing unit 104 is further transmitted to the game server 200 via the communication unit 107.

In S605, the control unit 101 determines whether an operation input related to preparation completion has been made. Upon determining that the operation input related to the preparation completion has been made, the control unit 101 manages the own device assuming the device is in the preparation complete state, and transmits information indicating that the preparation complete state is achieved to the game server 200. Then, the processing proceeds to S606. When the control unit 101 determines that the operation input related to the preparation completion has not been made, the processing returns to S604.

In S606, the control unit 101 determines whether the opponent device has also transitioned to the preparation complete state. The determination in this step may be made based on information received via the room. Upon determining that the opponent device has also transitioned to the preparation complete state, the control unit 101 sets the progress stage of the own device in the competitive game to be the play stage, and the processing proceeds to S607. When the control unit 101 determines that the opponent device has not transitioned to the preparation complete state, the processing in this step is repeated.

In S607, the control unit 101 determines whether the own device is in charge of executing the lottery processing for determining the action turn in the competitive game. The determination in this step may be made based on information on the order in which the access right to the relevant room is provided, provided by the game server 200 for example (the smartphone 100 provided with the access right earlier executes the processing). When the control unit 101 determines that the own device is in charge of executing the lottery processing, the processing proceeds to S608, and the processing proceeds to S609 when determined otherwise.

In S608, the control unit 101 executes the lottery processing for determining the action turn. When the lottery result is obtained, the control unit 101 stores information on the lottery result in the memory 103, and the processing proceeds to S609. The information on the lottery result is transmitted to the game server 200, to be shared with the opponent device.

In S609, the display control unit 105 issues a notification indicating the action turn of the own device or a notification indicating the player taking the first action turn, based on the information on the lottery result via the display unit 110, under the control by the control unit 101.

In S610, the display control unit 105 configures the screen showing the physical game item deployment status in the opponent environment and makes the display unit 110 display the screen, under the control by the control unit 101. More specifically, the control unit 101 performs control to start receiving the captured image captured by the opponent device from the game server 200 and to store the captured image of the opponent device thus received in the memory 103. At a timing when the screen to be displayed is configured, the display control unit 105 reads the latest captured image of the opponent device stored in the memory 103, superimposes a required GUI on the captured image, and makes the display unit 110 display the screen thus configured.

In S611, the control unit 101 determines whether an operation input for ending the competitive game has been made. The operation input for ending the competitive game may be configured to be acceptable via a predetermined GUI provided in a screen displayed in the play stage for example. Upon determining that the operation input for ending the competitive game has been made, the control unit 101 executes processing for terminating the access to the game server 200, and the competitive game processing is completed. When the control unit 101 determines that the operation input for ending the competitive game has not been made, the processing returns to S610.

As described above, with the game system of the present embodiment, the player can play the online competitive game, progressing through presentation of physical game items, with improved usability, thanks to the functions for matching, implementing communicable connection, preparing for the start of the competitive game, and displaying during the game, provided in an appropriate manner.

[First Modification]

According to the mode described in the above embodiment, the captured image captured by the smartphone 100 of the opponent player is received, and the display screen is configured with the GUI superimposed on the captured image in the play stage of the competitive game. Such a mode involves fluctuation of the quality of the screen displaying the physical game item deployment status of the opponent player in the play stage, in accordance with the positional relationship between the smartphone 100 and the physical game items in the play environment of the opponent player. Specifically, the angle of view in which the smartphone 100 of the opponent player captures an image depends on a member used for stabilizing the smartphone 100 in the play environment of the opponent player or the like. Thus, the captured image obtained might not show the physical game item deployment status in a state favorable for the competitive game, as illustrated in FIG. 7(a) for example.

Figure 7:
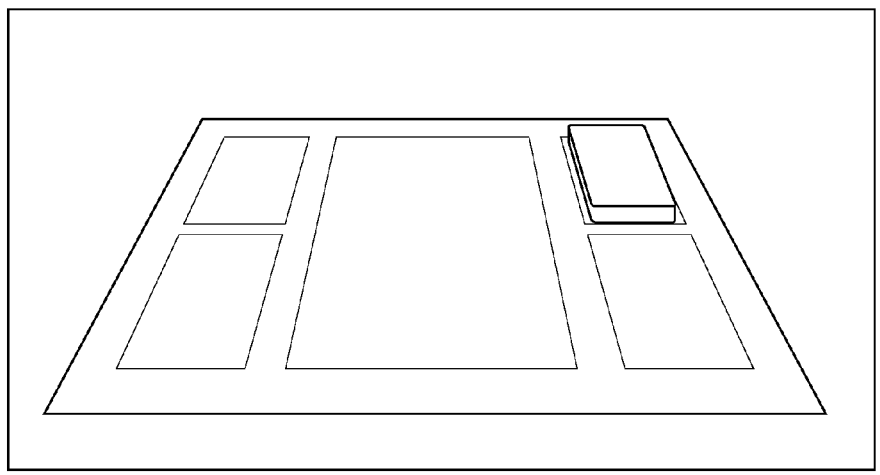
FIG. 7 is a diagram illustrating display in a preparation stage in an assisting application according to a first modification of the present invention.
Figure 7:
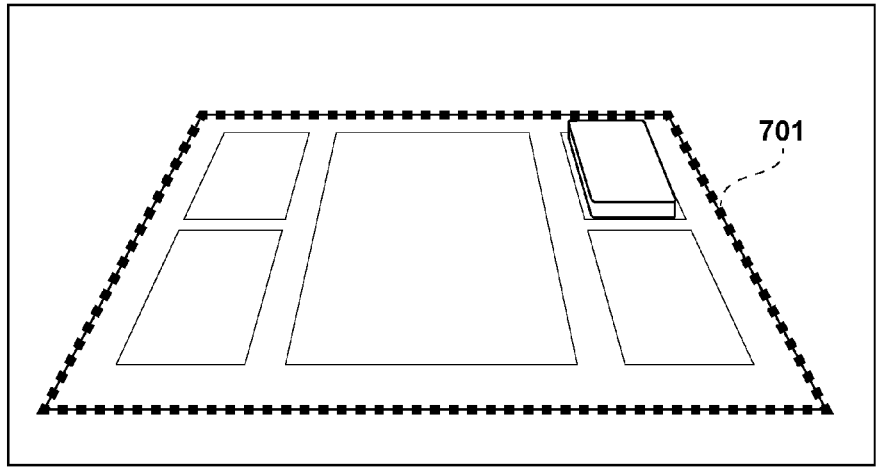
Figure 7:
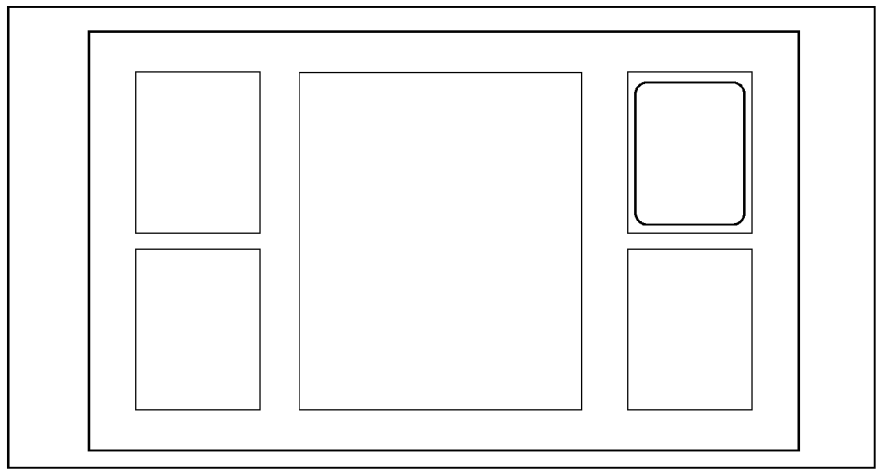

Thus, for example, when the display control unit 105 configures a screen for the play stage in each smartphone 100, an outer shape of an image of the relevant physical game item (at least one of the field sheet 400 and the game cards 500) appearing in the captured image obtained by the opponent player may be recognized within a frame 701 in FIG. 7(b), and extraction and deformation processing may be executed so that the image of the physical game item has a predetermined outer shape (a rectangle with an aspect ratio corresponding to the actual shape of the physical game item) to generate an image in a favorable state as illustrated in FIG. 7(c) for configuring the screen.

With this configuration, a screen showing a birds eye view of the board surface of the opponent player can be presented in the play stage, regardless of how the image is taken in the play environment of the opponent player. Thus, each player can play the gamer more comfortably, while favorably recognizing the physical game item deployment status of the opponent player.

While such deformation processing is described to be executed by the smartphone 100 that has received the captured image, embodiments of the present invention are not limited to this, and it is a matter of course that such deformation processing can be executed by the transmitter side smartphone 100 or the game server 200.

Second Embodiment

In the above embodiment and modification, a system is described in which when the matching start request is issued to the game server 200, the smartphone 100 of another player who has issued a request for matching under the same condition to the game server 200 is identified, and invited to the room. However, embodiments of the present invention are not limited to this, what is known as "free matching (matching depends on the game server 200 determining the opponent) system" and can also be applied to what is known as "custom matching system" enabling the competitive game to be executed with a certain person being the opponent player.

In the present embodiment, the assisting application is assumed to be configured to be not only capable of accepting an operation input for starting matching for the free matching system, but also capable of accepting an operation input for configurating a room for the custom matching system, for each game title for example. When the operation input for configurating a room for the custom matching system is accepted, the control unit 101 transmits a room configuration request to the game server 200 via the communication unit 107. Upon receiving the room configuration request, the server control unit 201 configures a new room, and manages the room information in the matching DB 204. In this case, the smartphone 100 that has issued the room configuration request is provided with the access right for the new room, and is further provided (issued) with connection destination information for accessing the room in a format that can be shared with other devices, such as an URL for example.

Here, the room information stored in the matching DB 204 may be different from that in the first embodiment in that it further includes an access code 911 associated with the connection destination information issued, as illustrated in FIG. 9(b) for example. The access code may be provided in the connection destination information, and when the access request based on the connection destination information is made, transmitted together with the request to be used for authentication for the room in the game server 200. Whether the room is for free matching or for custom matching can be identified based on whether there is the access code.

The player who has acquired the connection destination information can transfer the connection destination information to the smartphone 100 of a certain person who he or she wants to compete with, to proceed to execution of the competitive game with the person. More specifically, the player can share the connection destination information, returned from the game server 200 as a response to the room configuration request, with another person by transmitting the information to the other person using a function of the assisting application, email, a predetermined messenger application, a social networking service, or the like for example. The assisting application may be started and an access to the relevant room may be made, through the use of the connection destination information in the smartphone 100 that has acquired the shared information (access to a link indicated by the URL).

With this configuration, as in the first embodiment and the first modification, a plurality of smartphones 100 access the room, whereby the competitive game can be executed with communicable connection implemented via the room. Thus, the competitive game can progress with the communicable connection implemented between a predefined number of smartphones 100 that have accessed the room based on the connection destination information including the same access code.

Third Embodiment

In the second embodiment described above, a mode is described in which the connection destination information is used for implementing the communicable connection via the room between the smartphones 100 of players participating in the competitive game, but embodiments of the present invention are not limited to this. A configuration may be employed in which a third party (spectators) can watch the competitive game executed between players via a room. In other words, the room is assumed to be accessible not only by the smartphones 100 of the players executing the competitive game but also by smartphones 100 of spectators watching the competitive game, based on the connection destination information.

In the present embodiment, operation modes of the assisting application include a play mode and a spectator mode respectively for a player and a spectator of the competitive game. A configuration of the screen displayed on the display unit 110 differs depending on which of the operation mode the assisting application is operating. Here, as in the embodiment and the modification described above, the screen displayed in the play mode presents the captured image captured by the image capturing unit 104 of the own device in the preparation stage, and presents the captured image captured by the image capturing unit 104 of the opponent device in the play stage. As the screen displayed in the spectator mode, a screen is presented that includes all the captured images captured by the smartphones 100 of the players in either stage, with the number of captured images corresponding to the number of players, so that physical game item deployment statuses of all the players participating in the competitive game can be recognized at once.

Figure 8:
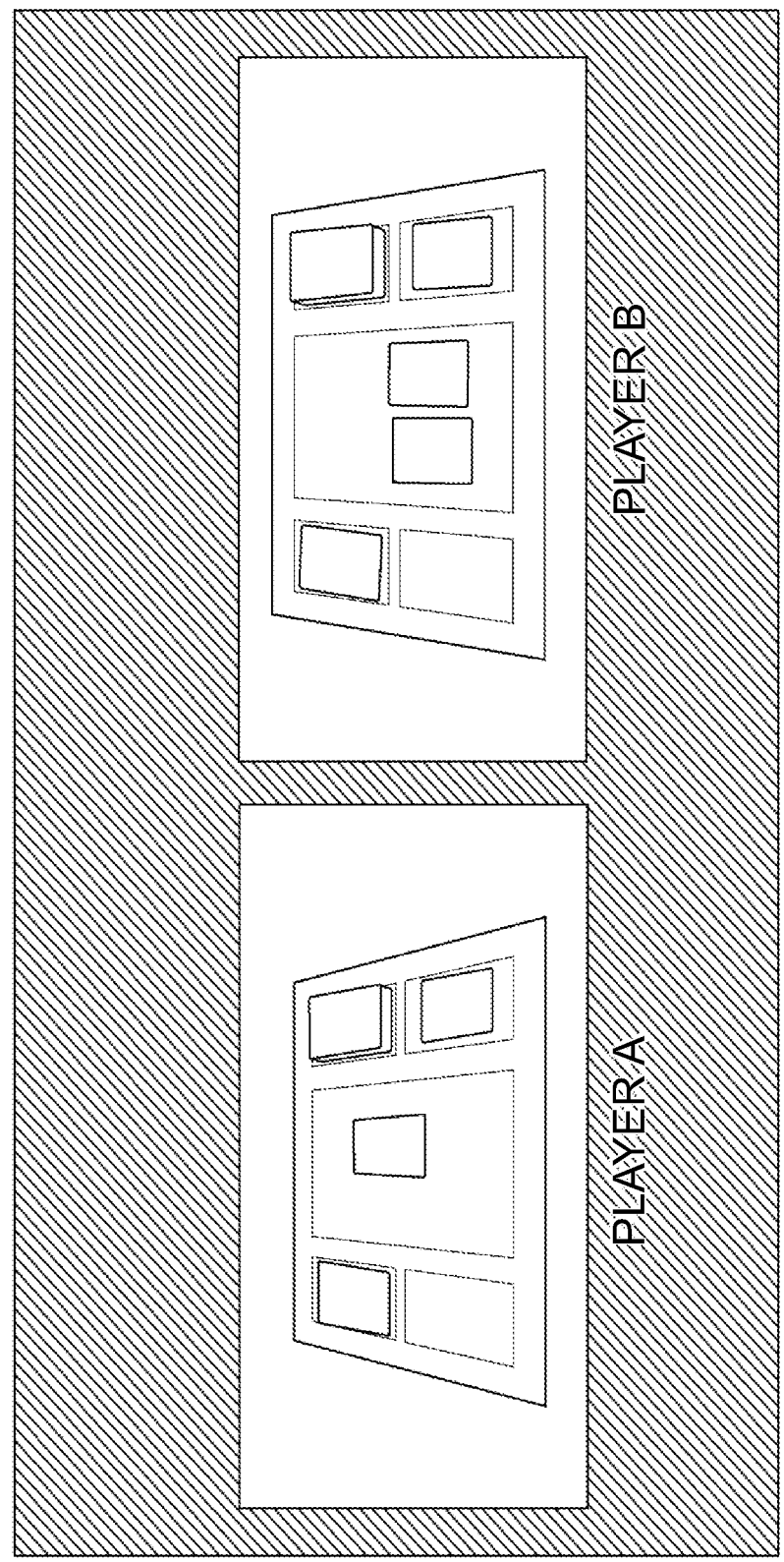
FIG. 8 is a diagram illustrating display in a spectator mode in an assisting application according to an embodiment and a modification of the present invention.

For example, when a two-player TCG is played using the game system of the present embodiment, the screen displayed on the display unit 110 of the smartphone 100 of a spectator includes captured images captured by the smartphones 100 of different players arranged in the horizontal direction in the screen as illustrated in FIG. 8.

Thus, regarding the room with which the competitive game is executed, the server control unit 201 performs control to transmit, to the smartphone 100 executing the assisting application operating under the play mode, the captured image received from the smartphone 100 of the player other than this smartphone 100, and to transmit the captured images received from the smartphones 100 of all the players, to the smartphone 100 executing the assisting application operating under the spectator mode.

Although an example of a screen configuration is described where in a mode in which the assisting application outputs a laterally elongated display screen as illustrated in FIG. 8, the captured images of the respective players are arranged in the horizontal direction, but embodiments of the present invention are not limited to this. The captured images of all the players may be arranged in any of the vertical and horizontal directions, depending on the aspect ratio of the output screen or the number of players participating in the competitive game.

To simplify the description, in the present embodiment, a description is given assuming that the captured images of all the players are arranged in the screen under the spectator mode regardless of the progress of the competitive game, that is, in both the preparation stage and play stage; however, the spectator screen including the captured images may be displayed only in the play stage. In this case, in the preparation stage, the screen including display indicating the preparation is under way may be presented to spectators.

Under which operation mode the assisting application operates may be determined in accordance with the order of access to the room based on the connection destination information for example. The competitive game can be played only when there are a predetermined number of players. Thus, the game server 200 provides information so that the assisting applications of the smartphones 100 (of the required number of players), required for the game play, that have made an early access based on the connection destination information operate under the play mode, and the assisting application of the smartphone 100 that has made an access after the required number of devices have made the access operates under the spectator mode. More specifically, for each room configured, the server control unit 201 may update the room information with a role assigned to each smartphone 100 based on the order of access to the room (a competing terminal used by a player or a spectator terminal used by a spectator), and transmit the information on the role to each smartphone 100, to be capable of changing the operation mode of the assisting application executed in the smartphone 100.

[Second Modification]

In the above third embodiment, a mode is described in which the operation mode of the assisting application is switched based on the order of access to the room, but embodiments of the present invention are not limited to this. For example, the right to be a player may be transferable between the smartphones 100 accessing the room. Alternatively, for example, a user of the smartphone 100 that has made the room configuration request related to issuance of the connection destination information may be provided with the right to serve as a host, which allows this user to give the right to be a player to any of the smartphones 100.

[Third Modification]

In the above third embodiment and second modification, a mode is described in which some of the smartphones 100 that have made the access based on the connection destination information can operate under the spectator mode, but embodiments of the present invention are not limited to this. In other words, the issuance of the connection destination information and the access based on the connection destination information may not be a requirement for watching the competitive game executed via the game system according to the present invention.

For example, the assisting application may have a function of receiving the matching start for the competitive game, and may also have a mode of accepting watching start (matching for a room where the match can be watched). In this case, when the assisting application detects an operation input for selecting the title of the game desired to be watched and for watching request, the watching request is transmitted from the smartphone 100 to the game server 200, and the server control unit 201 may determine the room in which the competitive game of the game title is progressing, that is, the room via which the smartphones 100 of the players have already been communicable connected, and then may give the access right and return the connection destination information to the room.

Furthermore, for example, the assisting application may be configured to be capable of referring to a list of rooms used for the competitive game currently progressing or rooms for which the players have been determined, select a room used for the match the spectator desires to watch from these lists, and access the relevant room.

[Fourth Modification]

In the above embodiments and modifications, it is assumed that the competitive game involving transmission and reception of captured images is executed when the game server 200 configures a room and each smartphone 100 utilizing the service accesses the room, but embodiments of the present invention are not limited to this. For example, transmission and reception of captured images between the smartphones 100 and the functions of rooms may be performed via an external device other than the game server 200, or performed utilizing a service different from that of the present game system. The game server 200 may perform matching and guiding to a room configured to indirectly implement communicable connection between the smartphones 100.

The functions of the connection device according to the present invention described with reference to the game server 200 may be implemented with one of the smartphones 100 involved in the competitive game serving as the host to also have the functions, for example.

While various embodiments of the present invention are described above separately as the first to the third embodiments and the first to the fourth modifications, the elements of these embodiments are separately described as an example, and it is a matter of course that embodiments can be made with the elements combined in any way.

Other Embodiments

The present invention is not limited to the embodiments described above, and can be modified and changed in various ways without departing from the spirit and the scope of the present invention, that is, within the scope of the gist of the invention. The game system, the information communication terminal, or the connection device according to the present invention can be implemented with a program causing one or more computers to function as the game system, the information communication terminal, or the connection device. The program may be provided/distributed by being recorded in a computer readable recording medium, or through an electric communication line.

REFERENCE SIGNS LIST

100: smartphone, 101: control unit, 102: recording medium, 103: memory, 104: image capturing unit, 105: display control unit, 106: operation input unit, 107: communication unit, 110: display unit, 200: game server, 201: server control unit, 202: server recording medium, 203: server memory, 204: matching DB, 205: server communication unit, 300: network, 400: field sheet, 500: game card

The invention claimed is:

1. A game assisting system for assisting execution of a game progressing through presentation of physical game items executed between players, the game assisting system comprising:
a plurality of information communication terminals associated with players participating in the game, one or more information communication terminals of the plurality of information communication terminals comprising: an acquisition unit to acquire information of a physical game item presented by the player; a display controller to control displaying of information on a display; and an information communication unit; and
a connection device comprising a connector to establish communicable connection between the plurality of information communication terminals associated with players participating in the game, wherein
the display controller causes the display to display the information of the physical game item acquired by the acquisition unit of the information communication terminal of a communication counterpart, when the communicable connection is established by the connector,
wherein the game comprises a plurality of types of games that are selectable,
wherein the one or more of the information communication terminals further comprises a selection unit for receiving a selection of one of the plurality of types of games that is executed,
wherein the connector establishes, when the selection unit of at least one of the plurality of information communication terminals receives the selection of the one of the plurality of types of games, the communicable connection between the plurality of information communication terminals including the information communication terminal,
wherein the information of the physical game item acquired by the acquisition unit comprises image information on a captured image of a game board and a placed object placed on the game board,
wherein the display controller causes the display to display, together with the image information, a guide display for a predetermined arrangement of the physical game item for the one of the plurality of types of games, and
wherein when causing the display to display the image information acquired for an information communication terminal that is the communication counterpart, the display controller applies deformation for changing an outer shape of an image of at least one of the game board and the placed object into a predetermined shape in the image information.

2. The game assisting system according to claim 1, wherein
progress of the game comprises a first stage and a second stage following the first stage, the display controller of a first information communication terminal of the plurality of information terminals that is communicably connected to a second information communication terminal of the plurality of information terminals causes the display to display the information of the physical game item acquired by the acquisition unit of the first information communication terminal in the first stage, and
in the second stage, causes the display to display the information on the physical game item acquired by the acquisition unit of the second information communication terminal instead of the information of the physical game item displayed in the first stage.

3. The game assisting system according to claim 2, wherein the first stage involves no game progress including presentation of the physical game item related to the game, and the second stage involves the game progress related to the game.

4. The game assisting system according to claim 2, wherein the first stage and the second stage are respectively a preparation stage of the physical game item of each of the players and a stage in which the game is executed using the physical game item prepared in the first stage, provided for the game.

5. The game assisting system according to claim 4, wherein
the one or more information communication terminals of the plurality of information communication terms further comprises a receiver that receives completion of preparation for a corresponding player, and
the game transitions to the second stage, when the completion of preparation in any of the plurality of information communication terminals communicably connected is received.

6. The game assisting system according to claim 1, wherein
the establishment of the communicable connection by the connector comprises setting a connection destination for the one of the plurality of types of games and issuing connection destination information comprising information on the connection destination,
the one or more information communication terminals of the plurality of information communication terminals further comprises an access unit configured to access, based on the connection destination information issued, a corresponding connection destination, and
the communicable connection between the plurality of information communication terminals is established in response to an access, based on the connection destination information comprising information on a same connection destination, to the connection destination.

7. The game assisting system according to claim 1, wherein the guide display comprises information on a size, in the image information, to be occupied by an image of at least one of the game board and the placed object.

8. The game assisting system according to claim 1, wherein
the one or more information communication terminals of the plurality of information communication terminals further comprises a determination unit to determine whether the physical game item is arranged to conform to the guide display, based on the image information, and the display controller causes the display to display a result of the determination by the determination unit.

9. The game assisting system according to claim 1, wherein
the one or more information communication terminals of the plurality of information communication terminals further comprises a receiver to receive, as an input of conversation information, at least one of selection of at least one of images provided in advance and text input,
the information communication unit transmits, when the input of the conversation information is received, the conversation information to the information communication terminal that is the communication counterpart, and
the display controller causes, when the conversation information is received, the display to display the conversation information.

10. The game assisting system according to claim 1, wherein
the one or more information communication terminals of the plurality of information communication terminals further comprises a lottery unit to execute lottery processing for determining action turns of the players of the game, and
the display controller causes the display to display a result of the lottery processing executed by any one of the plurality of information communication terminals communicably connected.

11. The game assisting system according to claim 1, wherein
the connection device further comprises a lottery unit to execute lottery processing for determining action turns of the players of the game, and
the display controller causes the display to display a result of the lottery processing executed by the connection device.

12. The game assisting system according to claim 1, wherein the communicable connection between the plurality of information communication terminals does not include near field communications.

\* \* \* \* \*